US008149725B2

(12) United States Patent
Lipps et al.

(10) Patent No.: US 8,149,725 B2
(45) Date of Patent: Apr. 3, 2012

(54) METHODS, SYSTEMS, AND COMPUTER PROGRAM PRODUCTS FOR A HIERARCHICAL, REDUNDANT OAM&P ARCHITECTURE FOR USE IN AN IP MULTIMEDIA SUBSYSTEM (IMS) NETWORK

(75) Inventors: Thomas P. Lipps, Cary, NC (US); David M. Sprague, Raleigh, NC (US)

(73) Assignee: Tekelec, Morrisville, NC (US)

( * ) Notice: Subject to any disclaimer, the term of this patent is extended or adjusted under 35 U.S.C. 154(b) by 538 days.

(21) Appl. No.: 11/605,947

(22) Filed: Nov. 29, 2006

(65) Prior Publication Data

US 2008/0025221 A1     Jan. 31, 2008

Related U.S. Application Data

(60) Provisional application No. 60/834,577, filed on Jul. 31, 2006.

(51) Int. Cl.
*H04J 1/16* (2006.01)
*H04L 12/66* (2006.01)
*G06F 15/173* (2006.01)

(52) U.S. Cl. .......................... 370/252; 370/352; 709/224
(58) Field of Classification Search .......................... None
See application file for complete search history.

(56) References Cited

U.S. PATENT DOCUMENTS

| | | | |
|---|---|---|---|
| 5,535,373 A | 7/1996 | Olnowich | |
| 5,765,172 A | 6/1998 | Fox | |
| 6,522,641 B1 * | 2/2003 | Siu et al. | 370/338 |
| 6,785,730 B1 | 8/2004 | Taylor | |
| 6,816,469 B1 | 11/2004 | Kung et al. | |
| 6,873,849 B2 | 3/2005 | de la Red et al. | |
| 7,027,582 B2 * | 4/2006 | Khello et al. | 379/220.01 |
| 7,171,460 B2 | 1/2007 | Kalavade et al. | |
| 7,254,603 B2 | 8/2007 | Weber et al. | |
| 7,380,022 B2 | 5/2008 | Tell et al. | |

(Continued)

FOREIGN PATENT DOCUMENTS

WO   WO 2006/066145 A2    6/2006

(Continued)

OTHER PUBLICATIONS

"Operator Guidebook to IMS and New Generation Networks and Services," www.morianagroup.com, Second Edition (Feb. 2006).

(Continued)

*Primary Examiner* — Nittaya Juntima
(74) *Attorney, Agent, or Firm* — Jenkins, Wilson, Taylor & Hunt, P.A.

(57) ABSTRACT

Methods, systems, and computer program products for a hierarchical, redundant OAM&P architecture for use in an IP multimedia subsystem (IMS) are disclosed. According to one aspect, the subject matter described herein includes a system for managing an Internet protocol multimedia system (IMS) network. The system includes a network operations, administration, maintenance, and provisioning (OAM&P) entity for communicating with an operator's network, a system OAM&P entity associated with the network OAM&P entity, and at least one message processing entity associated with the system OAM&P entity for processing signaling information and for implementing at least one application. The system OAM&P entity receives OAM&P information from one or more message processing entities and communicates at least some of the received OAM&P information to the network OAM&P entity. The network OAM&P entity receives OAM&P information from the system OAM&P entity and communicates at least some of the received OAM&P information to the operator's network.

45 Claims, 6 Drawing Sheets

U.S. PATENT DOCUMENTS

| | | | |
|---|---|---|---|
| 7,664,495 B1* | 2/2010 | Bonner et al. | 455/433 |
| 7,916,685 B2 | 3/2011 | Schaedler et al. | |
| 8,015,293 B2 | 9/2011 | Schaedler et al. | |
| 2002/0131395 A1 | 9/2002 | Wang | |
| 2002/0194378 A1 | 12/2002 | Foti | |
| 2002/0196775 A1 | 12/2002 | Tuohino et al. | |
| 2003/0005350 A1 | 1/2003 | Koning et al. | |
| 2003/0040280 A1 | 2/2003 | Koskelainen | |
| 2003/0131151 A1 | 7/2003 | Roach et al. | |
| 2003/0133558 A1 | 7/2003 | Kung et al. | |
| 2003/0149774 A1 | 8/2003 | McConnell et al. | |
| 2003/0233461 A1 | 12/2003 | Mariblanca-Nieves et al. | |
| 2004/0103157 A1 | 5/2004 | Requena et al. | |
| 2004/0152469 A1 | 8/2004 | Yla-Outinen et al. | |
| 2004/0203763 A1 | 10/2004 | Tammi | |
| 2004/0205212 A1 | 10/2004 | Huotari et al. | |
| 2004/0223489 A1 | 11/2004 | Rotsten et al. | |
| 2004/0225878 A1 | 11/2004 | Costa-Requena et al. | |
| 2004/0234060 A1 | 11/2004 | Tammi et al. | |
| 2004/0246965 A1 | 12/2004 | Westman et al. | |
| 2005/0007984 A1 | 1/2005 | Shaheen et al. | |
| 2005/0009520 A1 | 1/2005 | Herrero et al. | |
| 2005/0058125 A1 | 3/2005 | Mutikainen et al. | |
| 2005/0078642 A1 | 4/2005 | Mayer et al. | |
| 2005/0141511 A1 | 6/2005 | Gopal | |
| 2005/0155036 A1 | 7/2005 | Tiainen et al. | |
| 2005/0159156 A1 | 7/2005 | Bajko et al. | |
| 2005/0249196 A1 | 11/2005 | Ansari et al. | |
| 2005/0271055 A1 | 12/2005 | Stupka | |
| 2006/0090001 A1 | 4/2006 | Collins | |
| 2006/0121913 A1 | 6/2006 | Lin et al. | |
| 2006/0136557 A1 | 6/2006 | Schaedler et al. | |
| 2006/0161512 A1 | 7/2006 | Schaedler et al. | |
| 2006/0211423 A1 | 9/2006 | Ejzak et al. | |
| 2007/0121596 A1* | 5/2007 | Kurapati et al. | 370/356 |
| 2007/0174400 A1 | 7/2007 | Cai et al. | |
| 2008/0014961 A1 | 1/2008 | Lipps et al. | |
| 2010/0268802 A1 | 10/2010 | Lipps et al. | |

FOREIGN PATENT DOCUMENTS

| | | |
|---|---|---|
| WO | WO 2006/066149 A2 | 6/2006 |
| WO | WO 2008/008226 A2 | 1/2008 |

OTHER PUBLICATIONS

"Operator Guidebook to IMS and New Generation Networks and Services," www.morianagroup.com, First Edition (Aug. 2005).

Notification of Transmittal of the International Search Report and Written Opinion of the International Searching Authority, or the Declaration corresponding to PCT application No. PCT/US07/17116 (Feb. 15, 2008).

Official Action for U.S. Appl. No. 11/303,757 (May 28, 2009).

Official Action for U.S. Appl. No. 11/584,247 (Mar. 13, 2009).

Final Official Action for U.S. Appl. No. 11/303,757 (Oct. 6, 2008).

Notification of Transmittal of the International Search Report and Written Opinion corresponding to International Application No. PCT/US05/45813 (Mar. 24, 2008).

Official Action for U.S. Appl. No. 11/303,757 (Feb. 21, 2008).

Notification of Transmittal of the International Search Report and Written Opinion of the International Searching Authority, or the Declaration corresponding to International Application No. PCT/US07/15290 (Feb. 15, 2008).

Restriction Requirment for U.S. Appl. No. 11/303,757, (Oct. 4, 2007).

Official Action for U.S. Appl. No. 11/584,247 (Sep. 11, 2009).

Interview Summary for U.S. Appl. No. 11/584,247 (Jun. 25, 2009).

Commonly-assigned, co-pending U.S. Appl. No. 11/584,247 for "Methods, Systems, and Computer Program Products for Providing Geographically Diverse IP Multimedia Subsystem (IMS) Instances," (Unpublished, Filed Oct. 20, 2006).

Final Official Action for U.S. Appl. No. 11/303,757 (Dec. 9, 2009).

Supplementary European Search Report for European application No. 05854512.0 (Nov. 17, 2009).

Gonzalo et al., "The 3G IP Multimedia Subsystem," Chapter 3: General Principles of the IMS Architecture (Aug. 20, 2004).

Final Official Action for U.S. Appl. No. 11/584,247 (Apr. 14, 2010).

Communication pursuant to Article 94(3) EPC for European Application No. 05854512.0 (Feb. 8, 2010).

Communication pursuant to Article 94(3) EPC for European Application No. 05854503.9 (Feb. 8, 2010).

Final Official Action for U.S. Appl. No. 11/305,851 (Jan. 27, 2010).

Supplementary European Search Report for European Application No. 05854503.9 (Nov. 17, 2009).

Interview Summary for U.S. Appl. No. 11/584,247 (Sep. 25, 2009).

Official Action for U.S. Appl. No. 11/305,851 (Aug. 14, 2009).

Official Action for U.S. Appl. No. 11/303,757 (May 7, 2008).

Notification of Transmittal of the International Search Report and the Written Opinion of the International Searching Authority, or the Declaration for International Application No. PCT/US05/45802 (Sep. 15, 2006).

Linux-HA Architecture (Release 2), BasicArchitecture: Linux HA, http://www.linux-ha.org/BasicArchitecture, pp. 1-7 (Jun. 8, 2006).

"IP Multimedia Subsystem," Wikipedia, http://en.wikipedia.org/wiki/IP_Multimedia_Subystem (Downloaded from the Internet on May 22, 2006).

"IP Multimedia Subsystem IMS Over and Applications," 3G Americas, pp. 1-17 (Jul. 2004).

"$3^{rd}$ Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).

"All-IP Core Network Multimedia Domain," $3^{rd}$ Generation Partnerships Project 2 (3GPP2), 3GPP2 X.S0013-000-0, Version 1.0, pp. i-ii and 1-14 (Dec. 2003).

"$3^{rd}$ Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).

Camarillo, "Compressing the Session Initiation Protocol (SIP)," Network Working Group, RFC 3486 (Feb. 2003).

Garcia-Martin et al., "The Session Initiation Protocol (SIP) and Session Description Protocol (SDP) Static Dictionary for Signaling Compression (SigComp)," Network Working Group, RFC 3485 (Feb. 2003).

Arkko et al., Security Mechanism Agreement for the Session Initiation Protocol (SIP), Network Working Group, RFC 3329 (Jan. 2003).

Price et al., "Signaling Compression (SigComp)," Network Working Group, RFC 3320 (Jan. 2003).

"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).

Rosenberg et al., "SIP: Session Initiation Protocol," RFC 3261, pp. 1-252 (Jun. 2002).

Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).

Narten et al., "Privacy Extensions for Stateless Address Autoconfiguration in IPv6," RFC 3041, pp. 1-16 (Jan. 2001).

Faltstrom, "E.164 Number and DNS," RFC 2916, pp. 1-10 (Sep. 2000).

Vaha-Sipila, "URLs for Telephone Calls," RFC 2806, pp. 1-20 (Apr. 2000).

Aboba et al., "The Network Access Identifier," RFC 2486, pp. 1-8 (Jan. 1999).

Calhoun et al., "Diameter Proxy Server Extensions," IETF Working Draft, draft-calhoun-diameter-proxy-01.txt (Aug. 1, 1998).

Berners-Lee et al., "Uniform Resource Identifiers (URI): Generic Syntax," RFC 2396, pp. 1-38 (Aug. 1998).

Tekelec, "Eagle® Feature Guide," P/N 910-1225-01 (Jan. 1998).

Official Action for U.S. Appl. No. 11/584,247 (Oct. 19, 2010).

Communication pursuant to Article 94(3) EPC for European Application No. 05 854 503.9 (Oct. 13, 2010).

Communication pursuant to Article 94(3) EPC for European Application No. 05 854 512.0 (Oct. 12, 2010).

Final Official Action for U.S. Appl. No. 11/305,851 (Aug. 12, 2010).

Official Action for Chinese Patent Application No. 200780033839.3 (Jul. 15, 2010).

"Tekelec Announces TekCore IMS Core Platform," (Jun. 5, 2006).
Supplemental Notice of Allowability for U.S. Appl. No. 11/305,851 (Jan. 3, 2011).
Official Action for U.S. Appl. No. 11/303,757 (Dec. 22, 2010).
Notice of Allowance and Fee(s) Due for U.S. Appl. No. 11/305,851 (Nov. 18, 2010).
Commonly-assigned, co-pending U.S. Appl. No. 13/192,410 for "Methods, Systems, and Computer Program Products for Clustering and Communicating Between Internet Protocol Multimedia Subsystem (IMS) Entities," (Unpublished, filed Jul. 27, 2011).
Communication under Rule 71(3) EPC for European application No. 05854503.9 (Jul. 18, 2011).
Notice of Allowance and Fee(s) Due for U.S. Appl. No. 11/303,757 (May 11, 2011).
Notice of Abandonment for U.S. Appl. No. 11/584,247 (May 4, 2011).
Chinese Official Action for Chinese Patent Application No. 200780036126.2 (Oct. 25, 2010).

* cited by examiner

METHODS, SYSTEMS, AND COMPUTER PROGRAM PRODUCTS FOR A HIERARCHICAL, REDUNDANT OAM&P ARCHITECTURE FOR USE IN AN IP MULTIMEDIA SUBSYSTEM (IMS) NETWORK

RELATED APPLICATIONS

This application claims the benefit of U.S. Provisional Patent Application Ser. No. 60/834,577 filed Jul. 31, 2006; the disclosure of which is incorporated herein by reference in its entirety.

TECHNICAL FIELD

The subject matter described herein relates to methods and systems for use in an Internet protocol (IP) multimedia subsystem (IMS). More particularly, the subject matter described herein relates to methods, systems, and computer program products for implementing a hierarchical, redundant operations, administration, maintenance, and provisioning (OAM&P) architecture for managing an IMS network.

BACKGROUND

IMS is defined by the Third Generation Partnership Project (3GPP) as a new mobile network infrastructure that enables the convergence of data, speech, and mobile network technology over an IP-based infrastructure. IMS bridges the gap between the existing traditional telecommunications technology and Internet technology, allowing network operators to offer a standardized, reusable platform that can be used to provide services for both mobile networks and landline networks at the same time, providing unique mixtures of services with transparency to the end-user.

The main function of IMS is to set up media communication sessions between users and between users and applications. IMS uses the session initiation protocol (SIP) to for initiating, modifying, and terminating an interactive user session that involves multimedia elements, such as video, voice, instant messaging, online games, and virtual reality, and provides the service creator the ability to combine services in the same session and dynamically modify sessions "on the fly" (e.g., adding a video component to an existing voice session). As a result, new and innovative user-to-user and multi-user services become available, such as enhanced voice services, video telephony, chat, push-to-talk, and multimedia conferencing, all of which are based on the concept of a multimedia session.

As used herein, the term "IMS network" refers to a collection of connected entities performing IMS and other types of functions. An IMS network may be controlled by an operator, which is typically a business entity, such as a telephone company. The set of IMS entities within a particular operator's control may be referred to as an operator's network. The operator may control the operator's network from a network operations center (NOC) or other network control entity.

As used herein, the term "subscriber" refers to an operator's customer who uses the operator's network. Typically, all of an operator's subscribers are assigned to the operator's network. A subset of subscribers in an operator's network is referred to as a point of presence (POP).

As used herein, the term "IMS network element" (NE) refers to a logical grouping of entities that perform a specific assigned IMS or other function or group of functions within an IMS network.

As used herein, the term "node" refers to the portion of a network element on which an IMS, OAM&P, or other type of function resides.

IMS functions may include the call session control function (CSCF), the home subscriber server (HSS) function, and the authentication, authorization, and accounting (AAA) function. Non-IMS functions that may be present in an IMS network include application server (AS) functions.

The CSCF is used to process SIP signaling packets in the IMS. It aids in the setup and management of sessions and forwards messages between IMS networks. There are three distinct CSCF functions: proxy CSCF (P-CSCF, or "P-node"), interrogation CSCF (I-CSCF, or "I-node"), and serving CSCF (S-CSCF, or "S-node"). The P-CSCF is the first point of contact for a subscriber connecting to the network; it is the gateway into the IMS network. The P-CSCF implements compression and security. A P-CSCF may be configured to forward requests to a specific I-CSCF, which is the next node in the IMS signaling path. The I-CSCF provides a subscriber location function (SLF), which maps a subscriber to a specific S-CSCF, thus enabling the I-CSCF to route requests to the correct S-CSCF. The I-CSCF also provides a network interconnect function (NIF). The NIF knows how to route requests to other interconnecting networks (via their I-CSCFs). The S-CSCF is the core of the network. The S-CSCF maintains a database for all of the subscribers assigned to a POP. The S-CSCF provides services for the users, such as setting up media communication sessions between users and applications.

The HSS function holds key subscriber information and enables users (or servers) to find and communicate with other end users.

The AAA function authenticates the user, gives access only to valid users, grants the user authority to use certain functions or features available on the IMS network, and tracks user activity for accounting and billing purposes.

As stated above, other functions that may be present in an IMS network include non-IMS functions, such as those collectively referred to as application server (AS) functions. AS functions may include prepaid services, presence services, E.164 number translation (ENUM) services, location-based services, number portability services, message services (e.g., short message service (SMS), multi-media messaging, instant messaging), billing applications, network monitoring applications, call control services (e.g., call waiting, call holding, call forwarding, call transfer, call blocking), conference call services, announcement services, push-to-talk services, voicemail services, text to speech and speech to text services, law-enforcement-related services (e.g., malicious caller identification, lawful interception), and 2-G gateway services.

In an IMS network, each application or function may generate measurement data, event data, alarm data, and log data, collectively known as "MEAL" data, during operation of the function. An IMS or other function may also create entities known as stateful managed objects, which are abstract representations of network resources that are managed. A managed object may represent a physical entity, a network service, or an abstraction of a resource that exists independently of its use in management. The stateful managed object data is known as "SMOD" data. MEAL and SMOD data may be used by the NOC to monitor the status and operation of the operator's network.

In an IMS network, an application or function may accept configuration and provisioning commands as input. Configuration and provisioning commands may, for example, alter the state of a service, change the capability of an entity, create, maintain, or deactivate subscribers and subscriber attributes, and configure or customize the IMS system or operator's network. The NOC may control the operator's network by issuing configuration and provisioning commands that modify the function or operation of entities within the operator's network.

The network monitoring and control functions are often collectively referred to as "operations, administration, maintenance, and provisioning", or OAM&P, functions.

Operations functions may include automatic monitoring of environment, detecting and determining faults and alerting network administrators (e.g. using alarm data).

Administration functions typically involve collecting performance statistics (e.g. log data), collecting accounting data for the purpose of billing (e.g. events data), planning for capacity using usage data (e.g. measurements data), and maintaining system reliability. Administration functions can also involve maintaining the service databases which are used to determine periodic billing.

Maintenance functions typically involve upgrades, fixes, new feature enablement, backup and restore, and monitoring the media health (e.g. configuration data). The major tasks of maintenance functions are diagnostics and troubleshooting.

Provisioning functions typically handle the setting up of the user accounts, devices and services (e.g. provisioning data).

OAM&P functions are typically handled by an OAM&P entity, such as a server. A conventional IMS network may be configured such that one OAM&P server handles OAM&P functions for P-nodes, another OAM&P server handles OAM&P functions for I-nodes, and yet another OAM&P server handles OAM&P functions for S-nodes.

There are disadvantages associated with a conventional IMS network as described above. One disadvantage is that a network element containing more than one IMS function or other application may require more than one OAM&P server—one for each IMS function or application supported. Another disadvantage is that the NOC may need to communicate with several OAM&P servers within the operator's network.

Accordingly, in light of these disadvantages associated with IMS networks, there exists a need for improved OAM&P architecture for use in an IMS network.

SUMMARY

According to one aspect, the subject matter described herein includes a system for managing an Internet protocol multimedia system (IMS) network. The system includes a network operations, administration, maintenance, and provisioning (OAM&P) entity for communicating with an operator's network, a system OAM&P entity associated with the network OAM&P entity, and at least one message processing entity associated with the system OAM&P entity for processing signaling information and for implementing at least one application. The system OAM&P entity receives OAM&P information from one or more message processing entities and communicates at least some of the received OAM&P information to the network OAM&P entity. The network OAM&P entity receives OAM&P information from the system OAM&P entity and communicates at least some of the received OAM&P information to the operator's network.

According to another aspect, the subject matter described herein includes a method for managing an IMS network. The method includes performing a message processing function, including processing signaling information, performing at least one application function, and generating operations, administration, maintenance, and provisioning (OAM&P) information; performing a system OAM&P function including receiving at least some of the OAM&P information from the message processing function; and performing a network OAM&P function including receiving at least some of the OAM&P information from the system OAM&P function and communicating at least some of the OAM&P information to an operator's network.

According to yet another aspect, the subject matter described herein includes a method for remotely configuring an IMS entity. The method includes detecting the presence of a configurable IMS entity at a system operations, administration, maintenance, and provisioning (OAM&P) entity, communicating the detection to a network OAM&P entity, receiving configuration data from the operator at the network OAM&P entity, and communicating the configuration data to the system OAM&P entity, where the system OAM&P entity configures the configurable IMS entity based on the configuration data.

The subject matter described herein for managing an IMS network may be implemented in software in combination with hardware and/or firmware. For example, the subject matter described herein can be implemented in software executed by a processor. As such, the terms "entity" or "module" as used herein refer to software in combination with hardware and/or firmware, for implementing the feature being described. In one exemplary implementation, the subject matter described herein may be implemented using a computer program product comprising computer executable instructions embodied in a non-transitory computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

In order to avoid the necessity that an IMS network element providing more than one type of IMS function or other application contain a separate OAM&P server for each type of IMS function or application and to avoid the disadvantages associated with the need for the NOC to communicate with multiple OAM&P servers, the subject matter described herein includes a hierarchical, redundant OAM&P architecture for managing an IMS network. The system includes an IMS network, which is made up of one or more signaling network elements, each of which contains a system OAM&P entity for collecting and aggregating OAM&P information associated with that signaling network element; a central network operations center (NOC), from which the IMS network is controlled; and an OAM&P network element, which acts as the gateway for OAM&P information being communicated between the NOC and the IMS network.

Figure 1:
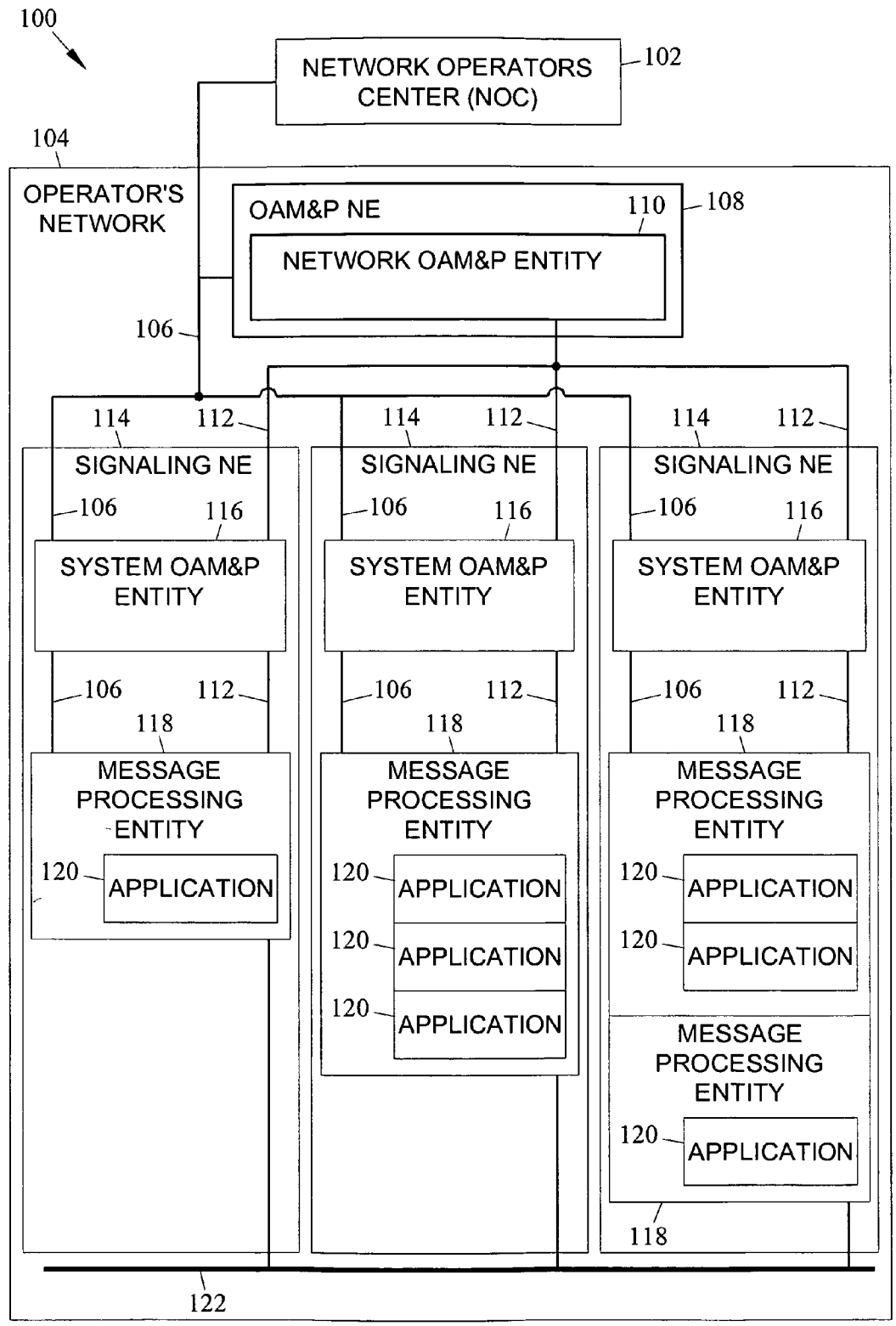
FIG. 1 is a block diagram illustrating an exemplary hierarchical operation, administration, maintenance, and provisioning (OAM&P) architecture for use in an Internet protocol multimedia subsystem (IMS) according to an embodiment of the subject matter described herein.

FIG. 1 is a block diagram of an exemplary hierarchical, redundant IMS network management system in accordance with an embodiment of the subject matter described herein. In FIG. 1, IMS network 100 includes a network operations center 102 controlling an operator's network 104 via a connection through operator's management network (also known as the external management interface, hereinafter referred to as XMI 106) to OAM&P network element 108. OAM&P network element 108 may include network OAM&P entity 110. Network OAM&P entity 110 may communicate via internal management network (also known as the internal management interface, hereinafter referred to as IMI 112) with one or more instances of signaling network element 114. Each signaling network element 114 may include system OAM&P entity 116, and one or more instances of message processing entity 118.

Network OAM&P entity 110 may aggregate OAM&P data, such as MEAL and SMOD data, from one or more instances of system OAM&P entity 116. The aggregated data may include OAM&P data associated with multiple types of applications 120 within operator's network 104. Network OAM&P entity 110 may send the aggregated data to network operations center 102. OAM&P data may for example be sent continuously, periodically, or as needed by network OAM&P entity 110. Alternatively, the OAM&P data may be sent in response to a request received from network operations center 102. Network OAM&P entity 110 may store data in preparation for communication with network operations center 102, allowing network OAM&P entity 110 to operate without requiring a continuous network connection to network operations center 102 or to continue operating when the connection to network operations center 102 is lost or otherwise interrupted. Network OAM&P entity 110 may receive from network operations center 102 configuration and provisioning data which network OAM&P entity 110 may use to modify its own operation or may forward to system OAM&P entity 116.

System OAM&P entity 116 may process OAM&P information received from one or more instances of message processing entity 118 and communicate the OAM&P information to network OAM&P entity 110. System OAM&P entity 116 may aggregate OAM&P data, such as MEAL and SMOD data, from one or more instances of message processing entity 118, multiple applications 120 and multiple types of applications 120 within signaling network element 114, and send the aggregated data to network OAM&P entity 110. Applications 120 may be IMS functions, such as P-CSCF, I-CSCF, S-CSCF, HSS, and AAA, or non-IMS functions, such as application server (AS) functions. Applications 120 typically generate MEAL and SMOD data and receive and use configuration and provisioning data. One or more instances of message processing entity 118 may communicate this OAM&P information with system OAM&P entity 116. Message processing entity 118 may communicate some types of OAM&P information, such as fault conditions, directly to network OAM&P entity 110 or to network operations center 102.

OAM&P data may for example be sent continuously, periodically, or as needed by system OAM&P entity 116, or sent in response to a request received from network OAM&P entity 110. System OAM&P entity 116 may store data in preparation for communication with network OAM&P entity 110, allowing system OAM&P entity 116 to operate without requiring a continuous network connection to network OAM&P entity 110, or to continue to operate when the connection to network OAM&P entity 110 is lost or otherwise interrupted. System OAM&P entity 116 may receive from network OAM&P entity 110 configuration and provisioning data which system OAM&P entity 116 may use to modify its own operation or may forward to message processing entity 118.

Message processing entity 118 may include one or more applications 120 and may process signaling information received through operator's signaling network (also known as the signaling interface, hereinafter referred to as SIGI 122). Message processing entity 118 may be a server, a cluster of processors, a processor card in a rack, or a software component, for example. Message processing entity 118 may aggregate OAM&P data, such as MEAL and SMOD data, from multiple applications 120 and multiple types of applications 120 within message processing entity 118, and send the aggregated data to system OAM&P entity 116. OAM&P data may for example be sent continuously, periodically, or as needed by message processing entity 118. Alternatively, OAM&P information may be sent in response to a request received from system OAM&P entity 116. Message processing entity 118 may store data in preparation for communication with system OAM&P entity 116, allowing message processing entity 118 to operate without requiring a continuous network connection to system OAM&P entity 116 or to continue to operate when the connection to system OAM&P entity 116 is lost or otherwise interrupted. Message processing entity 118 may receive from system OAM&P entity 116 configuration and provisioning data which message processing entity 118 may use to activate, deactivate, or modify applications 120.

In one embodiment, OAM&P network element 108 may include one or more instances of network OAM&P entity 110 for communicating OAM&P data with network operations center 102; for example, using multiple network OAM&P servers operating in a manner so as to allow load-sharing.

In another embodiment, signaling network element 114 may include one or more instances of system OAM&P entity 116 for communicating OAM&P data with network OAM&P entity 110; for example, using multiple system OAM&P servers operating in a manner so as to allow load-sharing.

In yet another embodiment, signaling network element 114 may include one or more instances of message processing entity 118 for communicating OAM&P data with system OAM&P entity 116; for example, using multiple message processing servers operating in a manner so as to allow load-sharing.

In yet another embodiment, message processing entity 118 may include multiple instances of the same application, different applications, or different variants of an application. For example, message processing entity 118 may include multiple instances of a P-CSCF application, or a mix of P-CSCF, I-CSCF, and S-CSCF applications. In yet another embodiment, message processing entity 118 may perform multiple instances of the same non-IMS function, different non-IMS functions, or different variants of a non-IMS function. For example, message processing entity 118 may perform multiple instant message services, or an ENUM service and a presence service, a variety of law-enforcement-related services. In other embodiments, message processing entity 118 may perform IMS functions, non-IMS functions, or a combination of IMS functions and non-IMS functions. For example, message processing entity 118 may perform voicemail services, an AAA function, or both.

In yet another embodiment, message processing entity 118 may be preconfigured to implement multiple applications 120, each of which may perform a different function or variants of a function. Message processing entity 118 may accept configuration commands by which message processing entity 118 activates a selected subset of preconfigured applications 120. Message processing entity 118 may also generate a status message indicating what applications 120 it is capable of implementing. The status message may be generated in response to activation of message processing entity 118. For a message processing entity implemented as a server, for example, activation (and subsequent generation of the status message) may be triggered by insertion of a server card into a frame, physical connection of a server into a network, logical activation of the server, providing power to the server, resetting the server, rebooting the server, or other triggering event. Any or all of the associated system OAM&P entity 116, the associated network OAM&P entity 110, or network operations center 102 may be configured to automatically detect the status message generated by message processing entity 118 and respond by sending to message processing entity 118 configuration commands which configure message processing entity 118 to, for example, perform a selected subset of applications 120 supported by message processing entity 118. Network OAM&P entity 110 may be configured to detect the status message generated by message processing entity 118 and in response alert network operations center 102 to the presence of the configurable message processing entity 118, provide an operator with options to configure the configurable message processing entity 118, receive the configuration selection from the operator, and forward the configuration selection to system OAM&P entity 116, which then configures message processing entity 118 according to the operator's selection. For an embodiment in which message processing entity 118 is preconfigured with multiple applications 120, the activation, deactivation, or modification of the operation of supported applications 120 does not require that the desired applications 120 be loaded or transferred into message processing entity 118, and thus configuration may be performed without taking the time or bandwidth required to download and install the desired applications 120. Configuration may be performed by setting a bit in a status register or sending a short command, for example.

Figure 2:
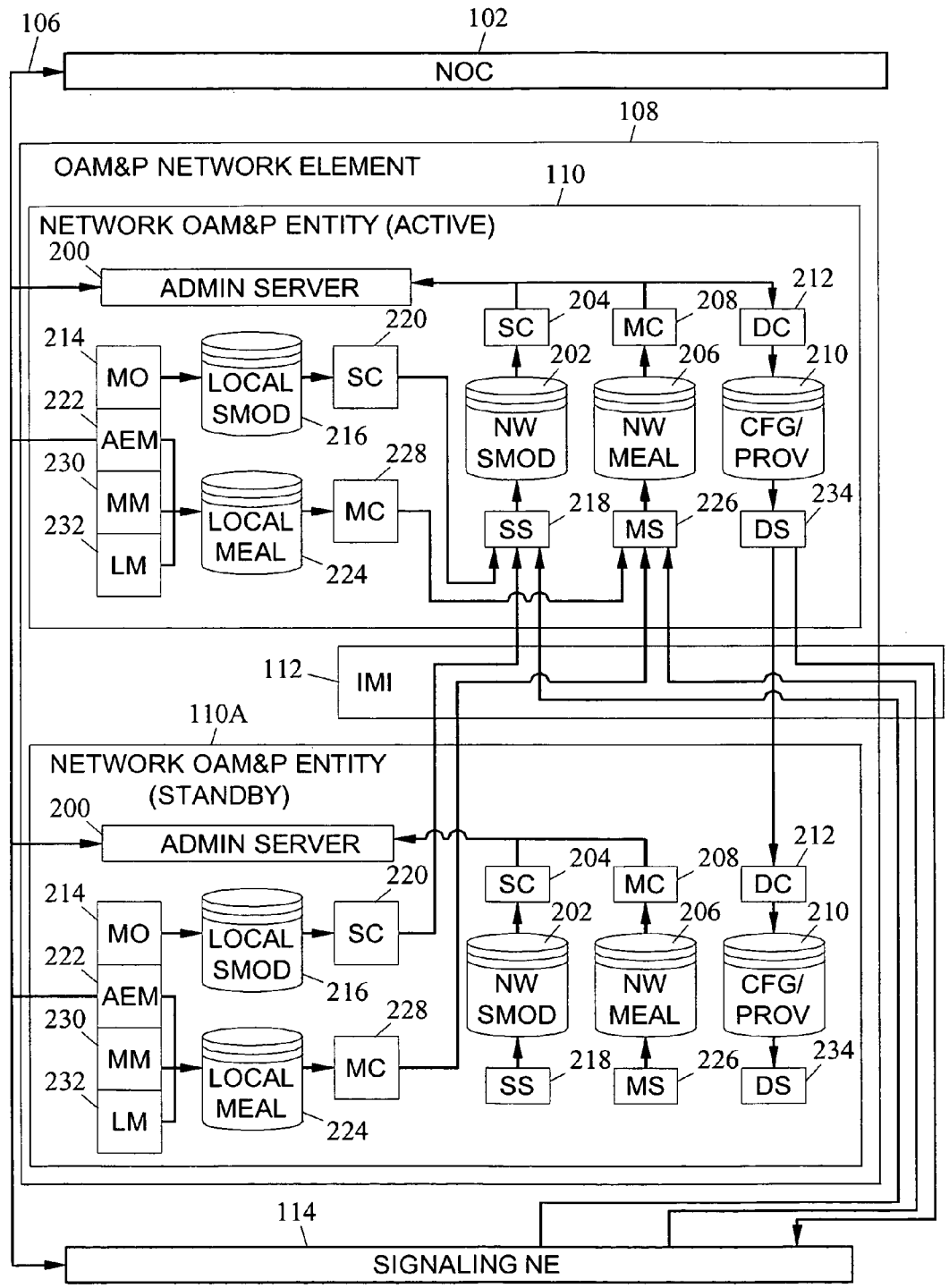
FIG. 2 is a block diagram illustrating an exemplary redundant OAM&P network element according to an embodiment of the subject matter described herein.

FIG. 2 is a block diagram of an exemplary OAM&P network element 108 in accordance with an embodiment of the subject matter described herein. In FIG. 2, OAM&P network element 108 includes an active instance 110 of network OAM&P entity and at least one standby instance 110A of network OAM&P entity adapted to become active in response to detection of a failure or deactivation of active network OAM&P entity 110. Active network OAM&P entity 110 may include an admin server 200 which may communicate with network operations center 102 via XMI 106. According to one embodiment, XMI 106 may provide a graphical user interface, or GUI, which is the primary interface that administrators and operators may use to interact with and control OAM&P network element 108. The GUI may provide functions available for user administration, provisioning, configuration, database management, fault management, and upgrade. XMI 106 may also provide a provisioning interface, used to provision subscriber data, a fault monitoring interface, used to trap alarms and events in the system, and a remote console interface. The remote console interface may use the secure shell (SSH) protocol and may be used to perform debugging and some installation and upgrade procedures.

Admin server 200 may handle all incoming requests from the GUI and provisioning interfaces and return responses to those requests. In addition, admin server 200 may autonomously display data, such as current alarm configuration, current measurements, or current logs, as configured by the user. According to one embodiment, admin server 200 may access aggregate stateful managed object data (SMOD) databases 202 via SMOD client 204, aggregate measurements, events, alarms, and logs (MEAL) databases 206 via MEAL client 208, and configuration and provisioning databases 210 via DB client 212.

Managed objects (MO) manager 214 is an interface through which changes to managed object states may be recorded. MO manager 214 may operate locally on network OAM&P entity 110 and may write each change record to local SMOD databases 216. Periodically, SMOD server 218 on active network OAM&P entity 110 may ask local SMOD client 220 to pull all of the entries from local SMOD databases 216 for collection in aggregate network SMOD databases 202.

Alarm and event manager 222 is an interface through which alarms and events may be generated. Alarm and event manager 222 may operate locally on network OAM&P entity 110 and may generate SNMP traps corresponding to the alarms and events detected. Alarm and event manager 222 may send the SNMP traps via the fault monitoring interface component of XMI 106 to a northbound fault management system in network operations center 102, if configured. Alarm and event manager 222 may be one of the local managers for MEAL data. As active network OAM&P entity 110 updates alarms and events locally, alarm and event manager 222 may update the local MEAL databases 224 with the requested change and may write the change to network MEAL databases 206. Periodically, MEAL server 226 on active network OAM&P entity 110 may ask local MEAL client 228 to pull the latest entries from local MEAL databases 224 for collection in aggregate network MEAL databases 206.

Measurement manager 230 is an interface through which measurements may be generated; it may operate locally on network OAM&P entity 110 and may write a change to local MEAL databases 224. Periodically, MEAL server 226 on active network OAM&P entity 110 may ask local MEAL client 228 to pull the latest entries from local MEAL databases 224 for collection in aggregate network MEAL databases 206.

Logging manager 232 is an interface through which log entries may be generated. Logging manager 232 may operate locally on network OAM&P entity 110 and may write each entry to local MEAL databases 224. Periodically, MEAL server 226 on active network OAM&P entity 110 may ask local MEAL client 228 to pull the latest entries from local MEAL databases 224 for collection in aggregate network MEAL databases 206.

Configuration and provisioning databases 210 contain configuration and provisioning information and may also be accessed by DB server 234. The responsibilities of DB server 234 may include replication of configuration and provisioning information into the standby instance of network OAM&P entity 110A and into signaling network element 114, and communication of configuration or provisioning messages to signaling network element 114.

In the example illustrated in FIG. 2, standby network OAM&P entity 110A is assumed to be configured as an identical copy of active network OAM&P entity 110. The role of standby network OAM&P entity 110A is to be ready to provide OAM functions and provisioning functions for the entire network, in the event that active network OAM&P entity 110 fails or is otherwise deactivated. This means that standby network OAM&P entity 110A may keep up with all user, administration, provisioning, configuration, database management, fault management, and upgrade changes made by active network OAM&P entity 110, but standby network OAM&P entity 110A does not provide these functions. In standby network OAM&P entity 110A, configuration and provisioning databases 210, DB client 212, MO manager 214, local SMOD databases 216, alarm and event manager 222, local MEAL databases 224, measurement manager 230, and logging manager 232, may function and operate the same as do their counterparts in active network OAM&P entity 110. However, in standby network OAM&P entity 110A, SMOD and MEAL data may be aggregated into the SMOD and MEAL databases on active network OAM&P entity 110 rather than on standby network OAM&P entity 110A. In order to maintain database consistency between the active and standby instances of the network OAM&P entity, active network OAM&P entity 110 may regularly replicate its aggregated network SMOD and MEAL databases onto standby network OAM&P entity 110A.

In the event of failure or deactivation of active network OAM&P entity 110, standby network OAM&P entity 110A becomes active; local databases on network OAM&P entity 110A will from that time forward be aggregated to their corresponding databases on network OAM&P entity 110A instead of on formerly active network OAM&P entity 110, and OAM&P information from each signaling network element 114 will be processed by network OAM&P entity 110A instead of by formerly active network OAM&P entity 110.

Figure 3:
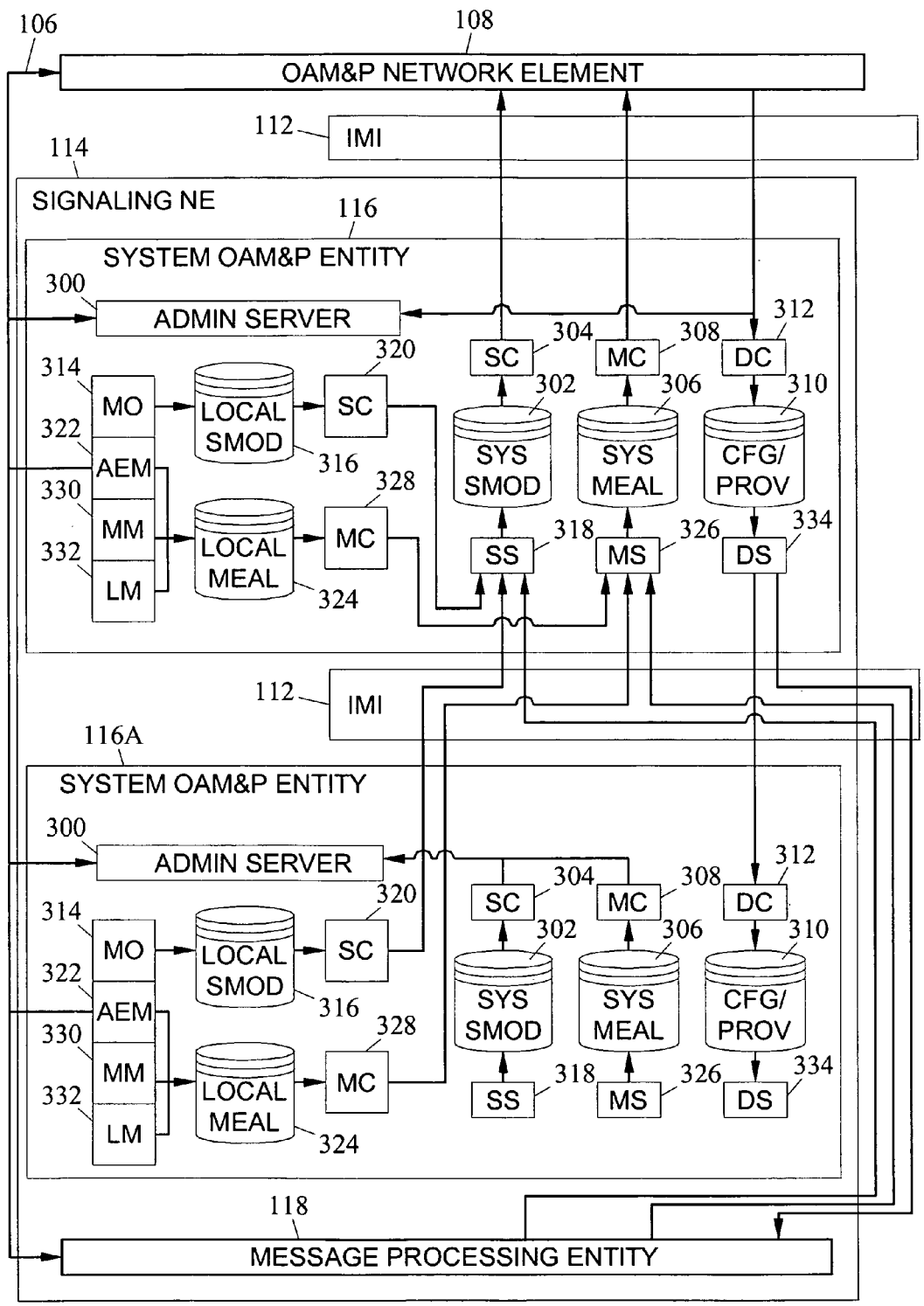
FIG. 3 is a block diagram illustrating an exemplary redundant signaling network element according to an embodiment of the subject matter described herein.

FIG. 3 is a block diagram of an exemplary signaling network element 114 in accordance with an embodiment of the subject matter described herein. In FIG. 3, signaling network element 114 includes an active instance 116 of system OAM&P entity and at least one standby instance 116A of system OAM&P entity adapted to become active in response to detection of a failure or deactivation of active system OAM&P entity 116. system OAM&P entity 116 may include an admin server 300 which communicates with a network operations center (not shown) via XMI 106.

Admin server 300 may handle incoming requests from the GUI and provisioning interfaces and return responses to those requests. In addition, admin server 300 may autonomously display data, such as current alarm configuration, current measurements, or current logs, as configured by the user. According to one embodiment, admin server 300 may access aggregate stateful managed object data (SMOD) databases 302 via SMOD client 304, aggregate measurements, events, alarms, and logs (MEAL) databases 306 via MEAL client 308, and configuration and provisioning databases 310 via DB client 312. In the example illustrated in FIG. 3, system SMOD databases 302 may be accessed also by network SMOD server 218 within OAM&P network element 108, for aggregation into the network SMOD databases 202. Similarly, the system MEAL databases 306 may be accessed also by network MEAL server 226 for aggregation into the network MEAL databases 206. Configuration and provisioning databases 310 may be accessed also by network DB server 234 within OAM&P network element 108.

Managed objects (MO) manager 314 is an interface through which changes to managed object states may be recorded. MO manager 314 may operate locally on system OAM&P entity 116 and may write each change record to local SMOD databases 316. Periodically, SMOD server 318 on active system OAM&P entity 116 may ask local SMOD client 320 to pull all of the entries from local SMOD databases 316 for collection in aggregate system SMOD databases 302.

Alarm and event manager 322 is an interface through which alarms and events may be generated. Alarm and event manager 322 may operate locally on system OAM&P entity 116 and may generate SNMP traps corresponding to the alarms and events detected. Alarm and event manager 322 may send the SNMP traps via the fault monitoring interface component of XMI 106 to a northbound fault management system in network operations center 102, if configured. Alarm and event manager 322 may be one of the local managers for MEAL data. As active system OAM&P entity 116 updates alarms and events locally, alarm and event manager 322 may update the local MEAL database 324 with the requested change and may write the change to system MEAL databases 306. Periodically, MEAL server 326 on active system OAM&P entity 116 may ask local MEAL client 328 to pull the latest entries from local MEAL databases 324 for collection in aggregate system MEAL databases 306.

Measurement manager 330 is an interface through which measurements may be generated; it may operate locally on system OAM&P entity 116 and may write a change to local MEAL databases 324. Periodically, MEAL server 326 on active system OAM&P entity 116 may ask local MEAL client 328 to pull the latest entries from local MEAL databases 324 for collection in aggregate system MEAL databases 306.

Logging manager 332 is an interface through which log entries may be generated. Logging manager 332 may operate locally on system OAM&P entity 116 and may write each entry to local MEAL databases 324. Periodically, MEAL server 326 on active system OAM&P entity 116 may ask local MEAL client 328 to pull the latest entries from local MEAL databases 324 for collection in aggregate system MEAL databases 306.

Configuration and provisioning databases 310 contain configuration and provisioning information and may also be accessed by DB server 334. The responsibilities of DB server 334 may include replication of configuration and provisioning information into the standby instance of system OAM&P entity 116A and into message processing entity 118, and communication of configuration or provisioning messages to message processing entity 118.

In the example illustrated in FIG. 3, standby system OAM&P entity 116A is assumed to be configured as an identical copy of active system OAM&P entity 116. The role of standby system OAM&P entity 116A is to be ready to provide OAM functions and provisioning functions for the network element under its control, in the event that active system OAM&P entity 116 fails or is otherwise deactivated. This means that standby system OAM&P entity 116A may keep up with all user, administration, provisioning, configuration, database management, fault management, and upgrade changes made by active system OAM&P entity 116, but standby system OAM&P entity 116A does not provide these functions. In standby system OAM&P entity 116A, configuration and provisioning databases 310, DB client 312, MO manager 314, local SMOD databases 316, alarm and event manager 322, local MEAL databases 324, measurement manager 330, and logging manager 332, may function and operate the same as do their counterparts in active system OAM&P entity 116. However, in standby system OAM&P entity 116A, SMOD and MEAL data may be aggregated into the SMOD and MEAL databases on active system OAM&P entity 116 rather than on standby system OAM&P entity 116A. In order to maintain database consistency between the active and standby instances of the system OAM&P entity, active system OAM&P entity 116 may regularly replicate its aggregated system SMOD and MEAL databases onto standby system OAM&P entity 116A.

In the event of failure or deactivation of active system OAM&P entity 116, standby system OAM&P entity 116A becomes active; local databases on system OAM&P entity 116A will from that time forward be aggregated to their corresponding databases on system OAM&P entity 116A instead of on formerly active system OAM&P entity 116, and OAM&P information from message processing entities 122 will be processed by system OAM&P entity 116A instead of by formerly active system OAM&P entity 116.

Figure 4:
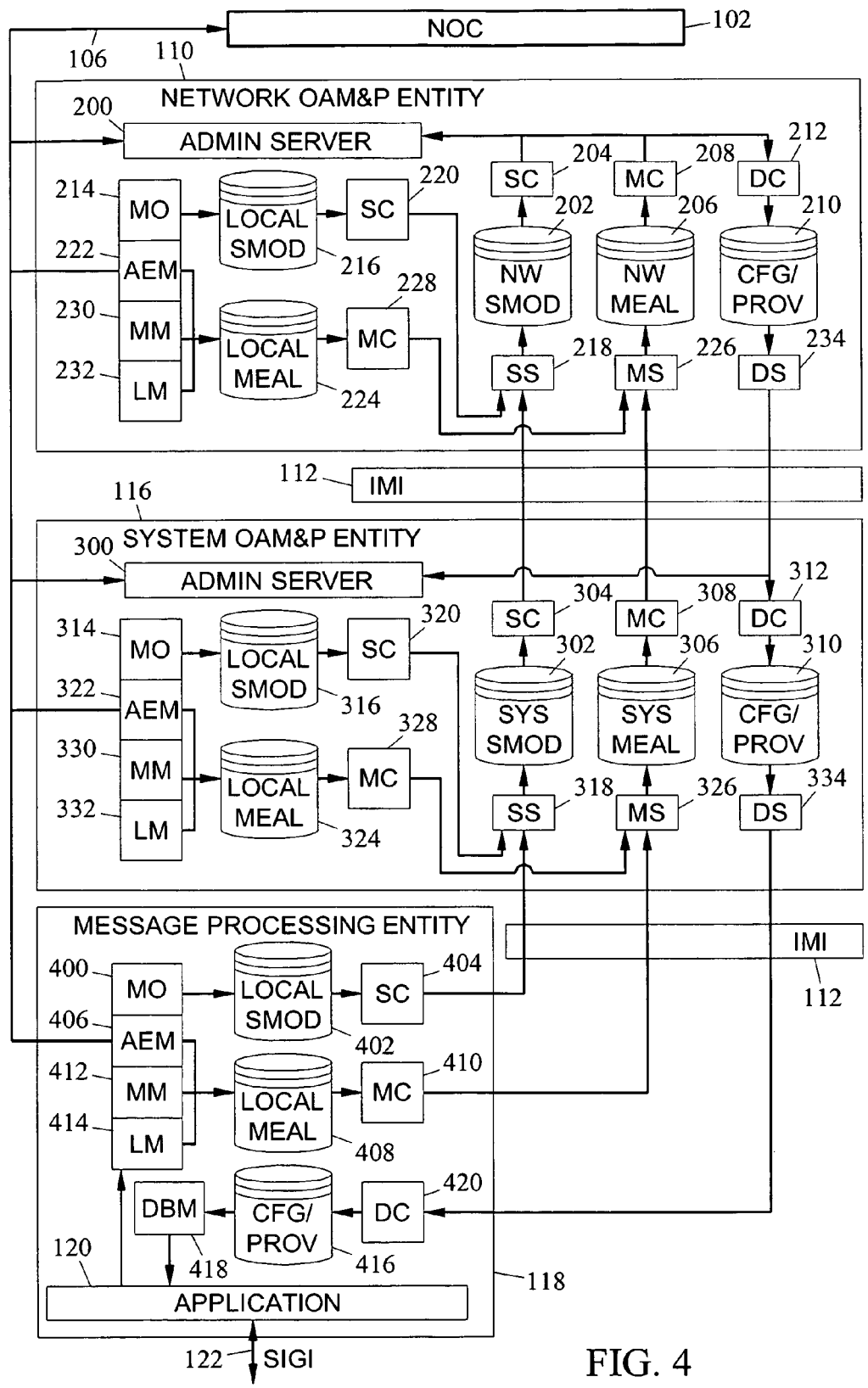
FIG. 4 is a block diagram illustrating an exemplary message processing entity within a hierarchical OAM&P architecture according to an embodiment of the subject matter described herein.

FIG. 4 is a block diagram of an exemplary message processing entity 118 operating within a hierarchical OAM&P architecture in accordance with an embodiment of the subject matter described herein. The role of message processing entity 118 includes providing the application messaging protocol interfaces and processing. In addition, message processing entity 118 may also have its own OAM&P components. Message processing entity 118 may be configured to replicate databases from system OAM&P entity 116 and generate faults to a fault management system. MEAL and SMOD data may be sent by message processing entity 118 to system OAM&P entity 116.

According to one embodiment, managed objects (MO) manager 400 is an interface through which changes to managed object states may be recorded. MO manager 400 may operate locally on message processing entity 118 and may write each change record to local SMOD databases 402. Periodically, local SMOD client 404 may be requested to pull all of the entries from local SMOD databases 402 for collection in aggregate system SMOD databases 302.

Alarm and event manager 406 is an interface through which alarms and events may be generated. Alarm and event manager 406 may operate locally on message processing entity 118 and may generate SNMP traps corresponding to the alarms and events detected. Alarm and event manager 406 may send the SNMP traps via the fault monitoring component of XMI 106 to a northbound fault management system in network operations center 102, if configured. Alarm and event manager 406 may be one of the local managers for MEAL data. As message processing entity 118 updates alarms and events locally, alarm and event manager 406 may update local MEAL databases 408 with the requested change. Periodically, MEAL server 326 on system OAM&P entity 116 may ask local MEAL client 410 to pull the latest entries from local MEAL databases 408 for collection in aggregate system MEAL databases 306.

Measurement manager 412 is an interface through which measurements may be generated. Measurement manager 412 may operate locally on message processing entity 118 and may write a change to local MEAL databases 408. Periodically, MEAL server 326 on system OAM&P entity 116 may ask local MEAL client 410 to pull the latest entries from the local MEAL databases 408 for collection in the aggregate system MEAL databases 306.

Logging manager 414 is an interface through which log entries may be generated. Logging manager 414 may operate locally on message processing entity 118 and may write each entry to local MEAL databases 408. Periodically, MEAL server 326 on system OAM&P entity 116 may ask local MEAL client 410 to pull the latest entries from local MEAL databases 408 for collection in aggregate system MEAL databases 306.

Configuration and provisioning databases 416 contain configuration and provisioning information and may also be accessed by one or more applications 120 via DB manager 418. Message processing entity 118 may be connected to signaling network 128, and may include one or more applications 120—performing, for example, different IMS functions, variants of the same IMS function, or different instances of the same IMS function. Configuration data may be sent from system OAM&P entity 116 to message processing entity 118 via system DB server 334 and local DB client 420. The configuration data received by message processing entity 118 may include a command to activate, deactivate, or change the application or applications 120 performed by message processing entity 118.

According to one embodiment, a standby message processing entity 118 may be configured as an identical copy of message processing entity 118 and adapted to become active in response to detection of a failure or deactivation of the active message processing entity 118. The role of the standby message processing entity 118 is to be ready to provide message processing functions in the event that the message processing entity 118 fails or is otherwise deactivated. In the event of failure or deactivation of message processing entity 118, the standby message processing entity 118 becomes active and assumes performance of the associated applications 120.

According to another embodiment, multiple message processing entities 122 may be configured as identical copies of active message processing entity 118 operating in a manner so as to allow load-sharing between the multiple instances of message processing entity 118.

Figure 5:
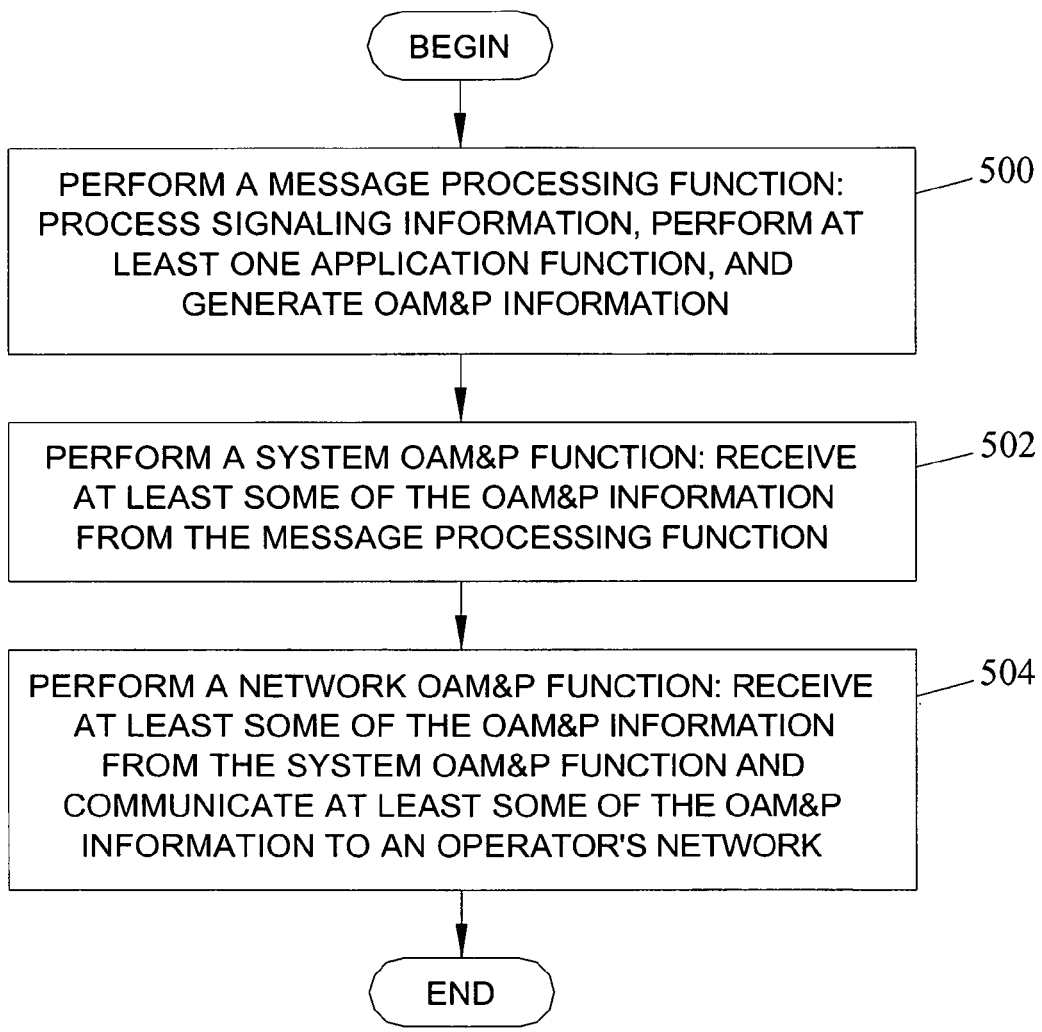
FIG. 5 is a flow chart illustrating a method for managing an Internet protocol multimedia subsystem (IMS) according to an embodiment of the subject matter described herein.

FIG. 5 is a flow chart illustrating an exemplary process for providing a hierarchical OAM&P system for managing an IMS system in accordance with an embodiment of the subject matter described herein. Referring to FIG. 5, in step 500 a network OAM&P function is performed. Performing a network OAM&P function may include processing and aggregating OAM&P information that has been received from one or more instances of system OAM&P entity 116, and communicating the OAM&P information with operator's network 104, through which OAM&P information will be communicated with a network control entity, such as network operations center 102. In step 502, a system OAM&P function is performed. Performing a system OAM&P function may include processing and aggregating OAM&P information that has been received from one or more instances of message processing entity 118, and communicating the OAM&P information with network OAM&P entity 110. In step 504, a message processing function is performed. Performing a message processing function may include processing signaling information and implementing one or more applications 120, which generate OAM&P information, communicating the OAM&P information with the system OAM&P entity 116, the network OAM&P entity 110, or both, and receiving configuration or provisioning information by which the application or applications 120 may be activated, deactivated, or modified.

Figure 6:
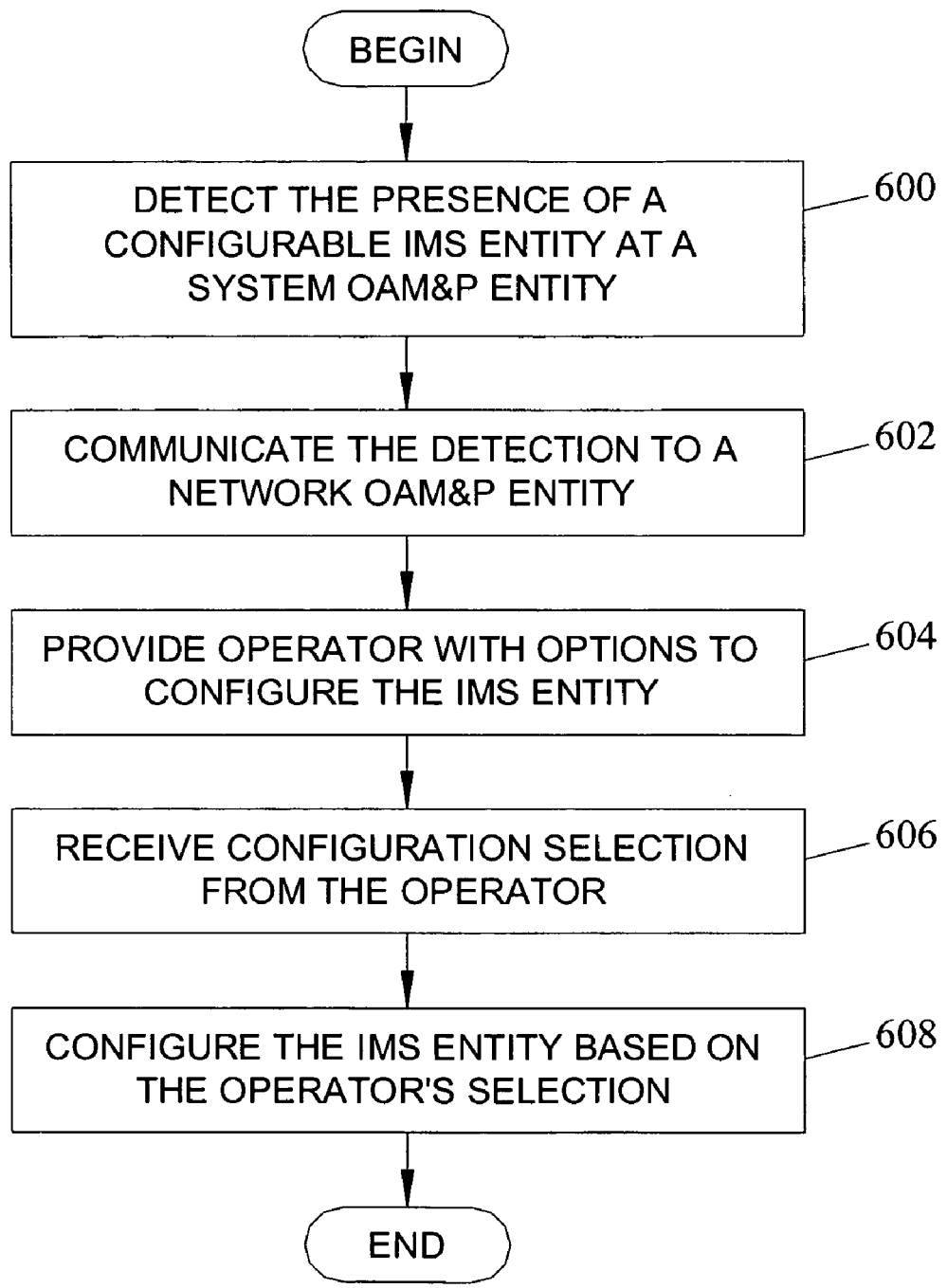
FIG. 6 is a flow chart illustrating a method for remotely configuring an Internet protocol multimedia subsystem (IMS) entity according to an embodiment of the subject matter described herein.

FIG. 6 is a flow chart illustrating an exemplary process for remotely configuring an IMS entity in accordance with an embodiment of the subject matter described herein. Referring to FIG. 6, in step 600, the presence of a configurable IMS entity, such as a configurable message processing entity 118, may be detected using a system OAM&P entity 116. The presence may be detected by communication of a status message, generated by the configurable IMS entity in response to activation of the configurable IMS entity, and received by system OAM&P entity 116. The status message may include a list or description of the capabilities of the configurable IMS entity. In step 602, system OAM&P entity 116 may communicate the detection to network OAM&P entity 110. In step 604, network OAM&P entity 110 may provide the operator, such as an operator at network operations center 102, with options to configure the IMS entity based on the capabilities of the IMS entity, as reported by the IMS entity during the detection process. In step 606, the operator may select the desired application or applications 120 to be activated, and convey that to network OAM&P entity 110. In step 608, network OAM&P entity 110 may convey the selection to system OAM&P entity 116, which may configure the IMS entity to activate the selected application or applications 126 or may convey the selection to the IMS entity so that the IMS entity may configure itself.

It will be understood that various details of the invention may be changed without departing from the scope of the invention. Furthermore, the foregoing description is for the purpose of illustration only, and not for the purpose of limitation.

What is claimed is:

1. A system for managing a telecommunications network, the system comprising:
    a system operations, administration, maintenance, and provisioning (OAM&P) entity that communicates OAM&P information to and from each of a plurality of applications directly, wherein at least one of the plurality of applications is different from another of the plurality of applications; and
    a network OAM&P entity for communicating OAM&P information between the system OAM&P entity and a network operations center,
    wherein the system OAM&P entity aggregates OAM&P information received from the plurality of applications and provides to the network OAM&P entity at least some of the aggregated OAM&P information received from the plurality of applications and wherein the network OAM&P entity aggregates information received from the system OAM&P entity and provides to the network operations center at least some of the aggregated OAM&P information received from the system OAM&P entity.

2. The system of claim 1 wherein the system OAM&P entity is configured to communicate at least some of the OAM&P information to at least one of the network OAM&P entity and the network operations center.

3. The system of claim 1 wherein at least one of the plurality of applications is configured to implement at least one of an IMS function and a non-IMS function.

4. The system of claim 3 wherein the IMS function comprises at least one of a proxy call session control function (P-CSCF), an interrogating call session control function (I-CSCF), a serving call session control function (S-CSCF), a home subscriber server (HSS) function, an authentication, authorization, and accounting (AAA) function, and a plurality of instances of the same IMS function.

5. The system of claim 3 wherein the non-IMS function comprises an application server (AS) function.

6. The system of claim 5 wherein the AS function comprises at least one of a prepaid services function, a presence services function, an E.164 number translation (ENUM) services function, a location-based services function, a number portability services function, a message services function, a billing applications function, a network monitoring function, a call control function, a conference call services function, an announcement services function, a push-to-talk services function, a voicemail services function, a text to speech/speech to text services function, a law-enforcement-related services function, and a 2-G gateway services function.

7. The system of claim 1 wherein the network OAM&P entity is configured to process and communicate OAM&P information associated with a plurality of different applications.

8. The system of claim 1 comprising at least one message processing entity for implementing the plurality of applications.

9. The system of claim 8 wherein the at least one message processing entity is configured to operate autonomously in the event of a loss of connection to the system OAM&P entity.

10. The system of claim 8 wherein at least one of the plurality of applications is implemented by a message processing entity that is different from a message processing entity that implements another of the plurality of applications.

11. The system of claim 8 wherein at least one of the plurality of applications is implemented by a message processing entity that is the same message processing entity that implements another of the plurality of applications.

12. The system of claim 8 wherein the at least one message processing entity is configured to receive configuration instructions for configuring the message processing entity to implement at least one of the applications specified by the configuration instructions.

13. The system of claim 12 wherein the at least one message processing entity is configured to send a status message including a description of capabilities of the message processing entity.

14. The system of claim 13 wherein the at least one message processing entity is configured to automatically generate and send the status message in response to activation of the message processing entity.

15. The system of claim 14 wherein activation of the at least one message processing entity comprises an event selected from the group consisting of physical insertion of the message processing entity into a signaling network element, electrical connection of the message processing entity with the signaling network element, logical activation of the message processing entity, electrical activation of the message processing entity, providing power to the message processing entity, resetting the message processing entity, and rebooting the message processing entity.

16. The system of claim 13 wherein the system OAM&P entity is configured to receive the status message, and, in response to receiving the status message, generate the configuration instructions.

17. The system of claim 13 wherein the network OAM&P entity is configured to receive the status message, and, in response to receiving the status message, generate the configuration instructions.

18. The system of claim 13 comprising a network control entity configured to receive the status message, and, in response to receiving the status message, generate the configuration instructions.

19. The system of claim 1 wherein the network OAM&P entity is configured to operate autonomously in the event of a loss of connection to the network operations center.

20. The system of claim 1 wherein the system OAM&P entity is configured to operate autonomously in the event of a loss of connection to the network OAM&P entity.

21. The system of claim 1 wherein at least one of the plurality of applications is located with the system OAM&P entity.

22. The system of claim 1 wherein the plurality of applications is not co-located with the system OAM&P entity.

23. The system of claim 1 wherein the telecommunications network comprises an Internet protocol multimedia subsystem (IMS) network.

24. A method for managing a telecommunications network, the method comprising:
performing a message processing function including processing signaling information, performing a plurality of application functions, and generating operations, administration, maintenance, and provisioning (OAM&P) information, wherein at least one of the plurality of application functions is different from another of the plurality of application functions;
performing, by a system OAM&P entity, a system OAM&P function including receiving at least some of the OAM&P information from each of the plurality of application functions directly, aggregating the received at least some of the OAM&P information from the plurality of applications, and providing to a network OAM&P entity at least some of the aggregated OAM&P information; and
performing, by the network OAM&P entity, a network OAM&P function including receiving from the system OAM&P entity the at least some of the OAM&P information from the plurality of applications, aggregating the received at least some of the OAM&P information from the system OAM&P entity, and communicating to a network operations center at least some of the aggregated OAM&P information from the system OAM&P entity.

25. The method of claim 24 wherein performing the system OAM&P function includes communicating OAM&P information to at least one of the network OAM&P entity and the network operations center.

26. The method of claim 24 wherein performing the at least one of the plurality of application functions includes at least one of performing an IMS function and performing a non-IMS function.

27. The method of claim 26 wherein performing the IMS function comprises performing at least one of a proxy call session control function (P-CSCF), an interrogating call session control function (I-CSCF), a serving call session control function (S-CSCF), a home subscriber server (HSS) function, an authentication, authorization, and accounting (AAA) function, and a plurality of instances of the same IMS function.

28. The method of claim 26 wherein performing the non-IMS function includes performing an application server (AS) function.

29. The method of claim 28 wherein performing the application server function includes performing at least one of a prepaid services function, a presence services function, an E.164 number translation (ENUM) services function, a location-based services function, a number portability services function, a message services function, a billing applications function, a network monitoring function, a call control function, a conference call services function, an announcement services function, a push-to-talk services function, a voice-mail services function, a text to speech/speech to text services function, a law-enforcement-related services function, and a 2-G gateway services function.

30. The method of claim 24 wherein performing the network OAM&P function comprises sending, receiving, and processing OAM&P information associated with the plurality of application functions.

31. The method of claim 24 wherein performing the system OAM&P function comprises sending, receiving, and processing OAM&P information associated with the plurality of application functions.

32. The method of claim 24 comprising performing the network OAM&P function autonomously in the event of a loss of connection to the network operations center.

33. The method of claim 24 comprising performing the system OAM&P function autonomously in the event of a loss of connection to the network OAM&P function.

34. The method of claim 24 comprising performing the message processing function autonomously in the event of a loss of connection to the system OAM&P function.

35. The method of claim 24 wherein the message processing function is performed by the system OAM&P entity.

36. The method of claim 24 wherein the message processing function is performed by an entity other than the system OAM&P entity.

37. The method of claim 36 where at least one of the plurality of application functions is performed at a network entity that is different from a network entity that performs another of the plurality of application functions.

38. The method of claim 36 comprising, by the message processing function, receiving and processing configuration instructions for performing at least one of the application functions, and performing an application function specified by the configuration instructions.

39. The method of claim 24 where the telecommunications network comprises an Internet protocol multimedia subsystem (IMS) network.

40. A method for managing a telecommunications network, the method comprising:
performing a message processing function including processing signaling information, performing a plurality of application functions, and generating operations, administration, maintenance, and provisioning (OAM&P) information, wherein at least one of the plurality of application functions is different from another of the plurality of application functions and wherein the message processing function is performed by an entity other than the system OAM&P entity;
performing, by a system OAM&P entity, a system OAM&P function including receiving at least some of the OAM&P information from each of the plurality of application functions directly;
performing, by a network OAM&P entity, a network OAM&P function including receiving at least some of the OAM&P information from the system OAM&P function and communicating at least some of the OAM&P information to a network operations center;
receiving and processing, by the message processing function, configuration instructions for performing at least one of the application functions, and performing an application function specified by the configuration instructions; and
sending, by the message processing function, a status message including a description of capabilities of the message processing function.

41. The method of claim 40 wherein sending a status message includes automatically sending the status message in response to activation of the message processing function.

42. The method of claim 40 wherein performing the system OAM&P function includes receiving the status message, and, in response to receiving the status message, generating the configuration instructions.

43. The method of claim 40 wherein performing the network OAM&P function includes receiving the status message, and, in response to receiving the status message, generating the configuration instructions.

44. The method of claim 40 comprising receiving, by a network control entity, the status message, and, in response to receiving the status message, generating the configuration instructions.

45. A computer program product comprising computer executable instructions embodied in a non-transitory computer readable medium for performing steps comprising:

performing a message processing function including processing signaling information, performing a plurality of application functions, and generating operations, administration, maintenance, and provisioning (OAM&P) information, wherein at least one of the plurality of application functions is different from another of the plurality of application functions;

performing, by a system OAM&P entity, a system OAM&P function including receiving at least some of the OAM&P information from each of the plurality of application functions directly, aggregating the received at least some of the OAM&P information from the plurality of applications, and providing to a network OAM&P entity at least some of the aggregated OAM&P information; and performing, by the network OAM&P entity, a network OAM&P function including receiving from the system OAM&P function the at least some of the OAM&P information from the plurality of applications, aggregating the received at least some of the OAM&P information from the system OAM&P function, and communicating to a network operations center at least some of the aggregated OAM&P information from the system OAM&P function.

\* \* \* \* \*